(12) United States Patent
Numata

(10) Patent No.: US 10,798,345 B2
(45) Date of Patent: Oct. 6, 2020

(54) IMAGING DEVICE, CONTROL METHOD OF IMAGING DEVICE, AND STORAGE MEDIUM

(71) Applicant: CANON KABUSHIKI KAISHA, Tokyo (JP)

(72) Inventor: Aihiko Numata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 16/165,048

(22) Filed: Oct. 19, 2018

(65) Prior Publication Data

US 2019/0132559 A1 May 2, 2019

(30) Foreign Application Priority Data

Oct. 26, 2017 (JP) .................. 2017-207076

(51) Int. Cl.
| | |
|---|---|
| *H04N 7/18* | (2006.01) |
| *G06T 7/20* | (2017.01) |
| *G06T 7/60* | (2017.01) |
| *H04N 5/232* | (2006.01) |
| *H04N 9/04* | (2006.01) |
| *G01S 3/00* | (2006.01) |

(52) U.S. Cl.
CPC .............. *H04N 7/188* (2013.01); *G01S 3/00* (2013.01); *H04N 5/232* (2013.01); *H04N 5/23206* (2013.01); *H04N 5/23238* (2013.01); *H04N 5/23245* (2013.01); *H04N 5/23296* (2013.01); *H04N 5/23299* (2018.08); *H04N 7/181* (2013.01); *H04N 9/04551* (2018.08); *G06T 7/20* (2013.01); *G06T 7/60* (2013.01); *G06T 2207/30232* (2013.01)

(58) Field of Classification Search
CPC .......... G08B 13/19689; G08B 13/1963; H04N 13/0239; H04N 5/10; H04N 5/12
See application file for complete search history.

(56) References Cited

U.S. PATENT DOCUMENTS

| | | | |
|---|---|---|---|
| 7,173,650 B2 * | 2/2007 | Cohen-Solal | G01S 3/785 348/143 |
| 8,390,686 B2 | 3/2013 | Tanaka | |
| 2005/0128292 A1 * | 6/2005 | Miyamaki | G01S 3/7864 348/143 |

(Continued)

FOREIGN PATENT DOCUMENTS

| | | |
|---|---|---|
| CN | 102959941 A | 3/2013 |
| CN | 103281508 A | 9/2013 |
| JP | 2007-116666 A | 5/2007 |

OTHER PUBLICATIONS

Jul. 30, 2020 Chinese Office Action in Chinese Patent Application No. 201811259860.1.

*Primary Examiner* — Clifford Hilaire
(74) *Attorney, Agent, or Firm* — Venable LLP

(57) ABSTRACT

A first imaging unit according to the present embodiment acquires a wide angle image. A second imaging unit according to the present embodiment captures a part of a capturing range of the first imaging unit and comprises a drive mechanism capable of changing a capturing direction. A control unit controls a frequency of acquiring the wide angle image based on at least one of a state of the second imaging unit and information included in a detail image captured by the second imaging unit.

18 Claims, 11 Drawing Sheets

(56) References Cited

U.S. PATENT DOCUMENTS

| | | | |
|---|---|---|---|
| 2006/0008176 A1* | 1/2006 | Igari | G06T 3/4038 |
| | | | 382/284 |
| 2008/0143821 A1* | 6/2008 | Hung | G06T 3/0062 |
| | | | 348/36 |
| 2009/0284601 A1* | 11/2009 | Eledath | H04N 7/181 |
| | | | 348/157 |
| 2010/0265331 A1 | 10/2010 | Tanaka | |
| 2013/0100255 A1* | 4/2013 | Ohba | G06T 3/4038 |
| | | | 348/47 |
| 2013/0100292 A1* | 4/2013 | Mojaver | H04N 5/2251 |
| | | | 348/159 |
| 2016/0323504 A1* | 11/2016 | Ono | H04N 5/2259 |

* cited by examiner

FIG. 4

| ITEM | PROBABILITY OF INTERRUPTION OF AUTOMATIC TRACKING OPERATION ← LOW                    HIGH → |
|---|---|
| VIEW ANGLE OF SECOND IMAGING UNIT | ← WIDE ANGLE                    TELEPHOTO → |
| SIZE OF SUBJECT TO BE TRACKING OBJECT WITHIN DETAIL IMAGE | ← SMALL                    LARGE → |
| MOTION SPEED OF SUBJECT TO BE TRACKED WITHIN DETAIL IMAGE | ← SLOW                    FAST → |

113a(b,c,d)

113a(b,c,d)

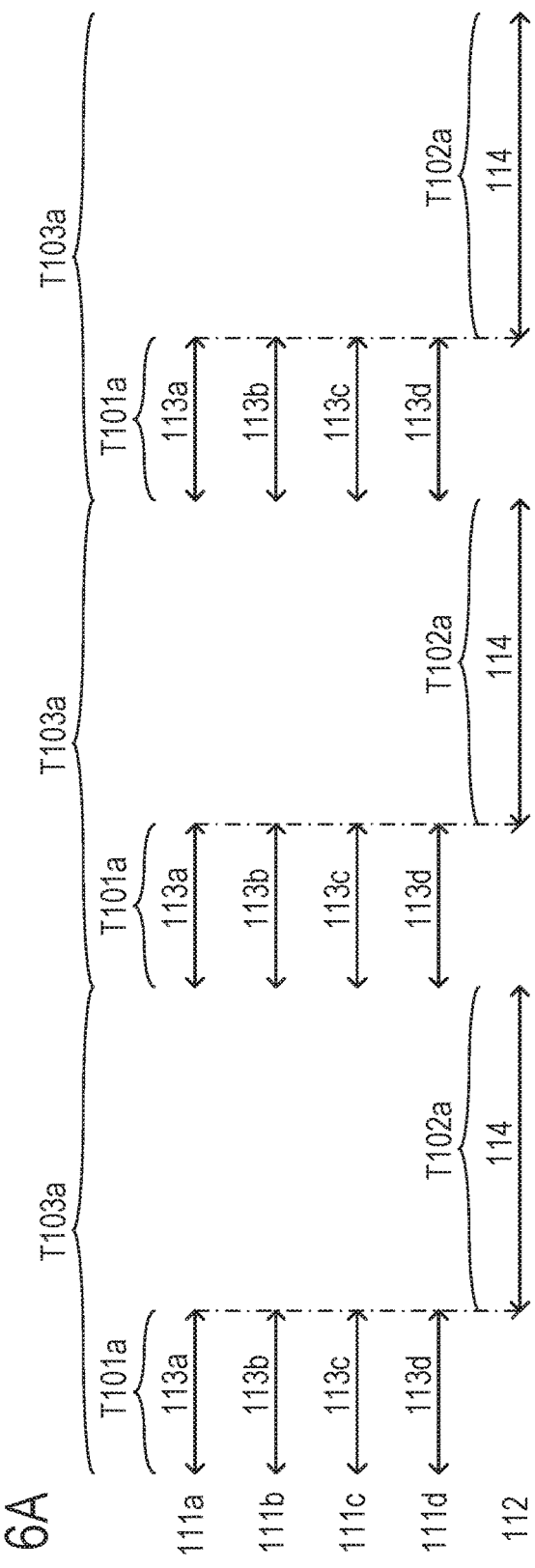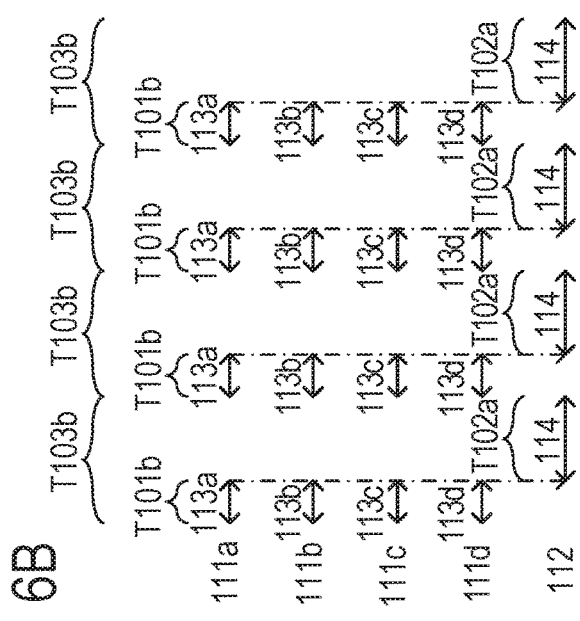

IMAGING DEVICE, CONTROL METHOD OF IMAGING DEVICE, AND STORAGE MEDIUM

BACKGROUND OF THE INVENTION

Field of the Invention

The present invention relates to a technology used for a surveillance camera or the like.

Description of the Related Art

In recent years, an imaging device that has different types of multiple cameras and realizes a new function by causing the cameras to cooperate with each other has been proposed. For example, Japanese Patent Application Laid-Open No. 2007-116666 discloses an imaging device that has a wide angle camera having a relatively wide view angle and a telephoto camera having a relatively narrow view angle and realizes a function of detecting a moving object by using the wide angle camera and tracking the detected moving object by using the telephoto camera.

When a moving object is tracked by using the imaging device disclosed in Japanese Patent Application Laid-Open No. 2007-116666, for example, when disturbance such as vibration is applied to the telephoto camera or when the speed of the moving object sharply changes, the telephoto camera is likely to lose sight of the moving object. Thus, Japanese Patent Application Laid-Open No. 2007-116666 discloses a method of re-detecting a moving object by using the wide angle camera when the telephoto camera loses sight of the moving object.

However, when the wide angle camera has a lower frequency of update (a longer time interval of update) of images than the telephoto camera, for example, the timing at which the missed moving object is re-detected by the wide angle camera is delayed from the timing at which the telephoto camera loses sight of the moving object. As a result, no tracking operation can be performed until the missed subject is re-detected, and therefore tracking accuracy decreases.

SUMMARY OF THE INVENTION

An imaging device according to the present invention includes: a first imaging unit that acquires a wide angle image; a second imaging unit that captures a part of a capturing range of the first imaging unit and comprises a drive mechanism capable of changing a capturing direction; and a control unit that controls a frequency of acquiring the wide angle image based on at least one of a state of the second imaging unit and information included in an image captured by the second imaging unit.

Further features of the present invention will become apparent from the following description of exemplary embodiments with reference to the attached drawings.

BRIEF DESCRIPTION OF THE DRAWINGS

FIG. 4 is a diagram illustrating a correspondence table for acquiring a probability of interruption of a tracking operation.

FIG. 6A and FIG. 6B are timing charts of wide angel image generation.

DESCRIPTION OF THE EMBODIMENTS

Preferred embodiments of the present invention will now be described in detail in accordance with the accompanying drawings.

General Configuration of First Embodiment

Figure 1A:
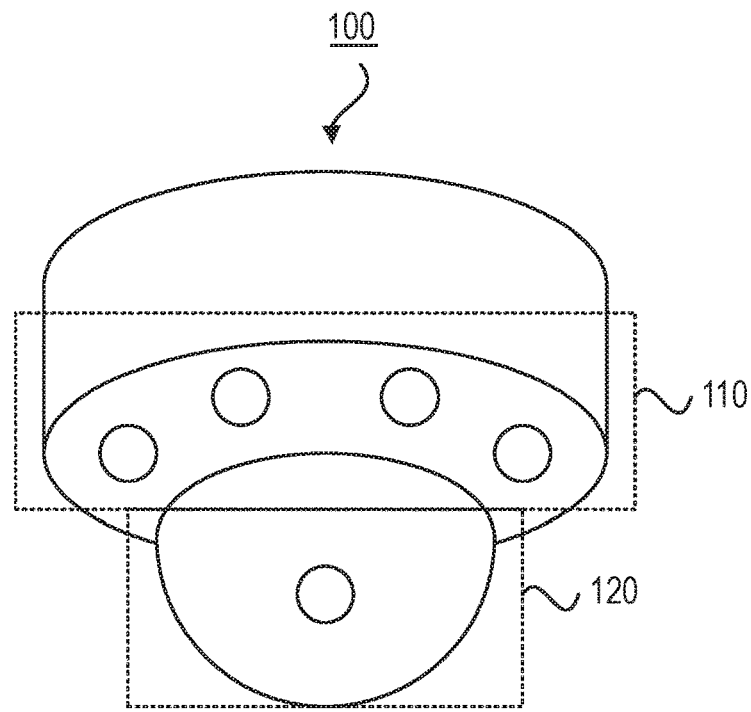
FIG. 1A and FIG. 1B are diagrams illustrating a schematic external appearance and an internal arrangement example of an imaging device of a first embodiment.
Figure 1B:
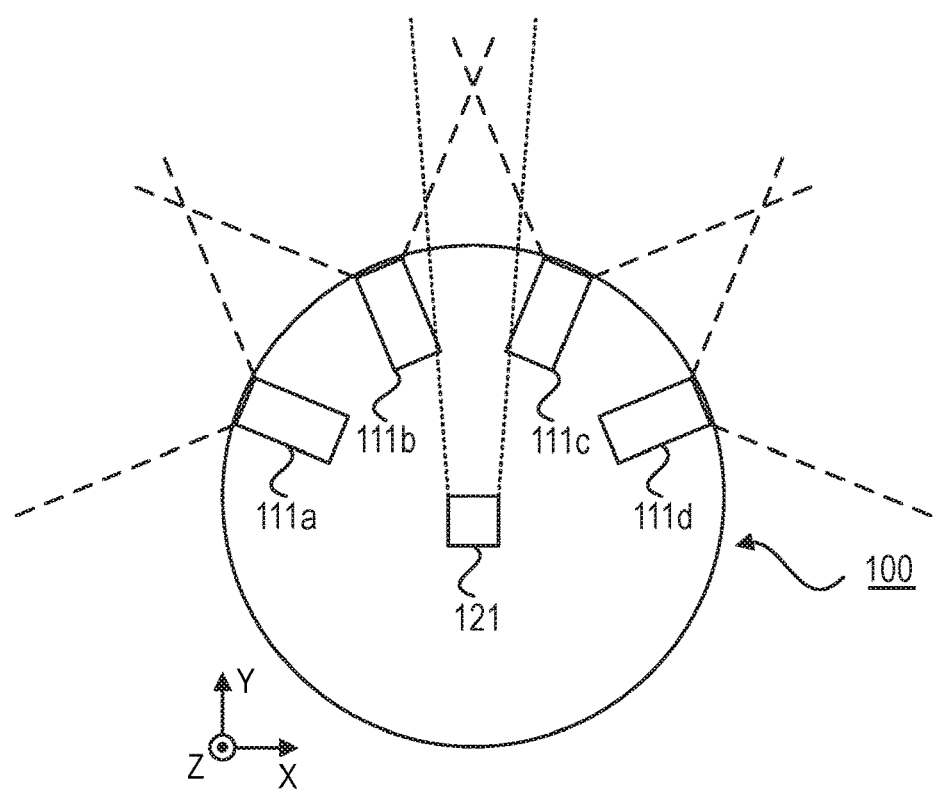
Figure 2:
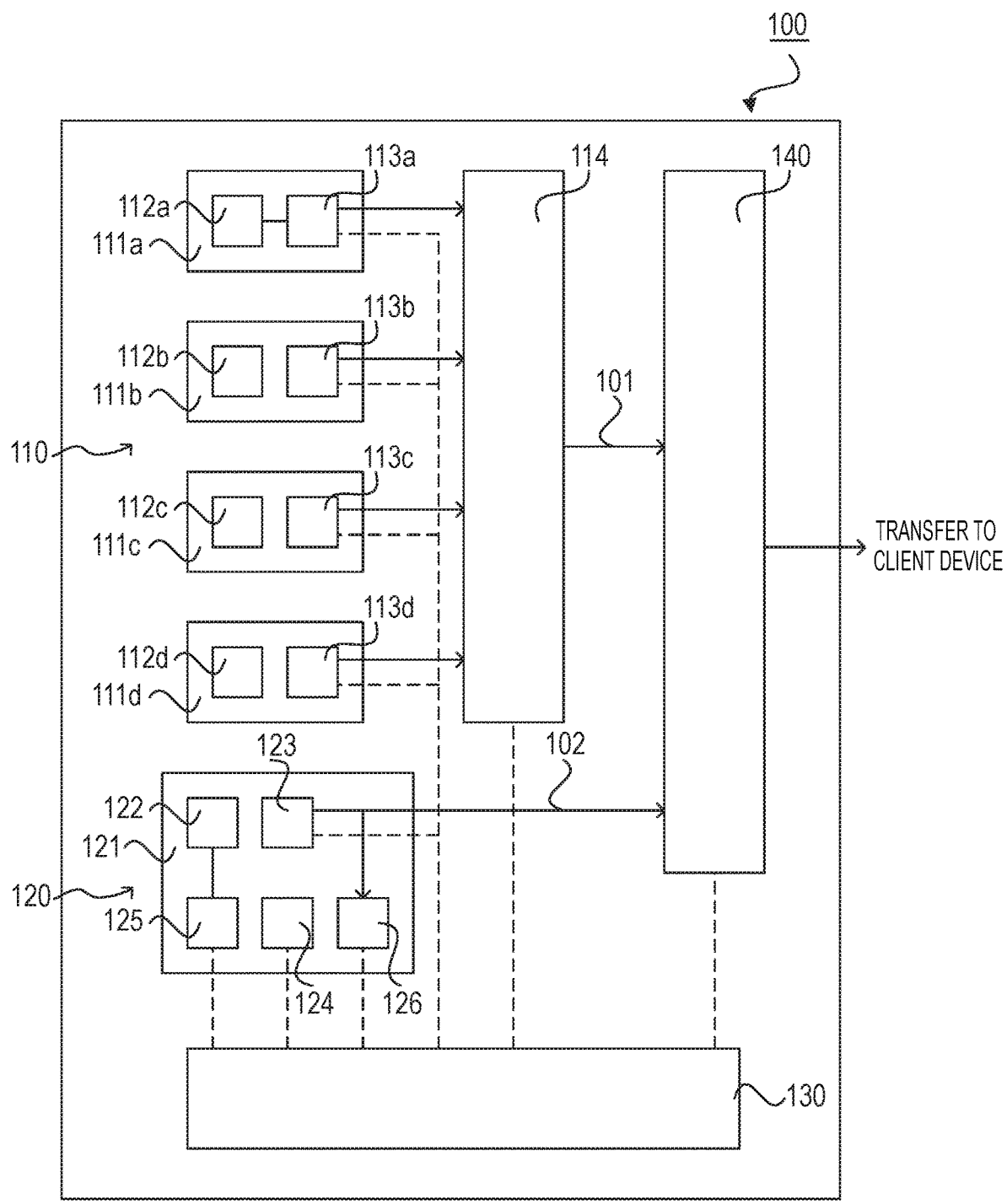
FIG. 2 is a functional block diagram of an imaging device of the first embodiment.

FIG. 1A, FIG. 1B, and FIG. 2 are diagrams illustrating a general configuration of an imaging device according to the present embodiment. Note that, in each of the following drawings, the same function as or a portion corresponding to each component of FIG. 1A, FIG. 1B, or FIG. 2 is labeled with the same reference numeral, and the duplicated description thereof will be omitted.

FIG. 1A and FIG. 1B are diagrams illustrating a general configuration example of the imaging device of the present embodiment. FIG. 1A is a perspective view of the imaging device 100 when viewed in an oblique direction, and FIG. 1B is an arrangement diagram of the imaging devices 100 when viewed from the upper side (from the +Z-axis direction). Further, FIG. 2 is a functional block diagram illustrating an internal configuration of the imaging device of the present embodiment.

The imaging device 100 has a first imaging unit 110 that acquires an imaging signal in which a capturing range with a wide view angle is captured (referred to as a wide angle image 101) and a second imaging unit 120 that acquires an imaging signal in which a part of the capturing range of the first imaging unit 110 is captured (referred to as a detail image 102). Further, the imaging device 100 has a control unit 130 that controls operations of the first imaging unit 110 and the second imaging unit 120, a transfer unit 140 that transfers the wide angle image 101 and the detail image 102 to the outside, and the like.

The transfer unit 140 is connected to an external client device via a wired or wireless network and adapted to be able to sequentially transfer the wide angle image 101 and the detail image 102 to the same network by using a switch to select the wide angle image 101 or the detail image 102. The external client device transmits a command that controls the imaging device 100 to the imaging device 100 via the network. The imaging device 100 receives the command by the transfer unit 140 and transmits a response to the command to the client device. The client device is an external device such as a personal computer (PC), and the network is formed of a wired LAN, a wireless LAN, or the like. The imaging device 100 may be configured to be externally powered via the network.

First Imaging Unit: Multiview Wide Angle Camera

The first imaging unit 110 has a plurality of imaging units 111a, 111b, 111c, and 111d arranged such that the capturing ranges thereof partially overlap with each other. The imaging device 100 combines images acquired by the imaging units 111a to 111d in a combining processing unit 114 to generate the wide angle image 101. The combining processing unit 114 calculates a correlation coefficient while shifting an overlapping portion of images acquired by the plurality of adjacent imaging units (such as the imaging unit 111a and the imaging unit 111b, for example) and calculates a displacement between the plurality of images by applying a so-called pattern matching technology. The combining process unit 114 then adjusts the positions of the plurality of images in accordance with the displacement, combines the plurality of position-adjusted images so as to connect these images to each other, and thereby generates the wide angle image 101.

The plurality of imaging units 111a to 111d have image-formation optical systems 112a to 112d and solid state image pickup devices 113a to 113d, respectively, and acquire images by forming a subject image on the solid state image pickup devices via the image-formation optical systems, respectively. Drive operations of respective solid state image pickup devices 113a to 113d and signal readout operations from respective solid state image pickup devices 113a to 113d are controlled by the control unit 130.

Second Imaging Unit: Monocular Telephoto Camera

The second imaging unit 120 is formed of a single imaging unit 121 and has an image-formation optical system 122, a solid state image pickup device 123, a drive mechanism 124 that can change the capturing direction, and a zoom and focus mechanism 125 that can change a capturing view angle and adjust a focus position. Further, the imaging device 100 has a signal processing unit 126 that detects a particular subject and acquires motion information thereon from the captured image. The signal processing unit 126 detects a particular subject and acquires motion information thereon from the detail image 102 acquired by the second imaging unit 120. Note that the signal processing unit 126 is also able to detect a subject and acquires motion information from the wide angle image 101. In the second imaging unit 120, in the same manner as in the first imaging unit 110, the drive operation of the solid state image pickup device 123 and the signal readout operation from the solid state image pickup device 123 are controlled by the control unit 130.

The drive mechanism 124 has a motor and a gear and is configured so that power for driving the motor is controlled by the control unit 130 and thereby the imaging unit 121 can rotate around a particular rotation axis. Note that the drive mechanism 124 may be configured such that a plurality of motors are provided to have a plurality of rotation axes. The zoom and focus mechanism 125 similarly has a motor and a gear and changes the zoom ratio by moving some of the lenses of the image-formation optical system 122 in the optical axis direction. Further, the zoom and focus mechanism 125 similarly has a motor and a gear and changes the capturing view angle and the focus position by moving some of the lenses of the image-formation optical system 122 in the optical axis direction.

The signal processing unit 126 detects a motion vector of a subject by detecting a difference between frames of multiple frames of the detail images 102 sequentially transmitted from the second imaging unit 120. Then, in the imaging device 100, tracking of a particular subject is performed by using a motion vector of a particular subject detected by the signal processing unit 126 to control the capturing direction of the second imaging unit 120. The capturing direction of the second imaging unit 120 is controlled by using the control unit 130 to control the drive mechanism 124. Note that the signal processing unit 126 is also able to detect a motion vector of a subject by detecting a difference between frames of multiple frames of the wide angle images 101 from the combining processing unit 114. Note that the subject to be a tracking object here is a subject intended to be monitored, which may be a person, a vehicle, or the like in general.

Difference in Update Frequency of Images

As described above, the first imaging unit 110 generates the wide angle image 101 by performing combining by the combining process unit 114 on images acquired by the plurality of imaging units 111a to 111d. On the other hand, the second imaging unit 120 acquires an image captured by the single imaging unit 121 as the detail image 102 without performing a combining process. Therefore, when the frequency of signal readout from the solid state image pickup devices 113a to 113d is the same as the frequency of signal readout from the solid state image pickup device 123, the update frequency of the wide angle image 101 is lower than the update frequency of the detail image 102 for the time required for the combining process. Thus, when the update frequency of the wide angle image 101 is lower (time interval of update is longer) than the update frequency of the detail image 102, in a case where the second imaging unit 120 loses sight of a moving tracking object, the timing of the first imaging unit 110 re-detecting the tracking object may be delayed resulting in a reduction in tracking accuracy.

Figure 3:
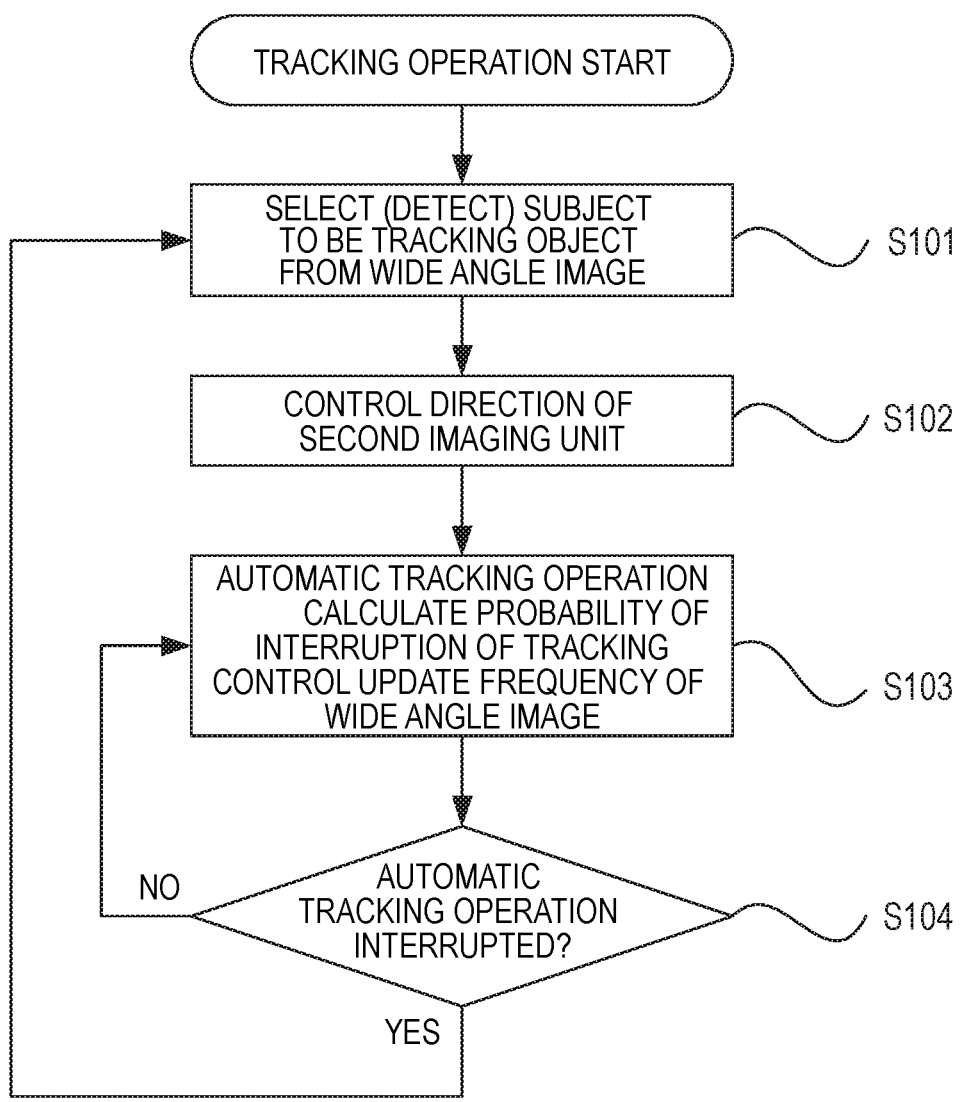
FIG. 3 is a flowchart illustrating a tracking operation of the imaging device of the first embodiment.

Accordingly, as described later, the imaging device 100 of the present embodiment can suppress a reduction in tracking accuracy of a moving object by controlling the update frequency of the wide angle image 101 acquired by the first imaging unit 110. Before a tracking operation in the imaging device 100 of the present embodiment is described in detail, a tracking operation in the imaging device disclosed in Japanese Patent Application Laid-Open No. 2007-116666 (hereafter, referred to as an imaging device of a comparative example) will be now described for comparison of the tracking operation with respect to the imaging device 100 of the present embodiment. FIG. 3 is a flowchart of a tracking operation of the imaging device 100 of the present embodiment, and FIG. 11 is a flowchart of a tracking operation of the imaging device in the comparative example disclosed in Japanese Patent Application Laid-Open No. 2007-116666.

Flowchart of Imaging Device of Comparative Example

First, with reference to the flowchart of FIG. 11, the tracking operation of the imaging device of the comparative example will be described. The imaging device of the comparative example is configured to acquire a wide angle image by using a wide angle camera and acquire a detail image by using a telephoto camera having a relatively narrower view angle than the wide angel camera. Further, the imaging device of the comparative example is configured to use the wide angle image captured by the wide angle camera to detect a moving object and further uses the detail image captured by the telephoto camera to track a particular subject.

Figure 11:
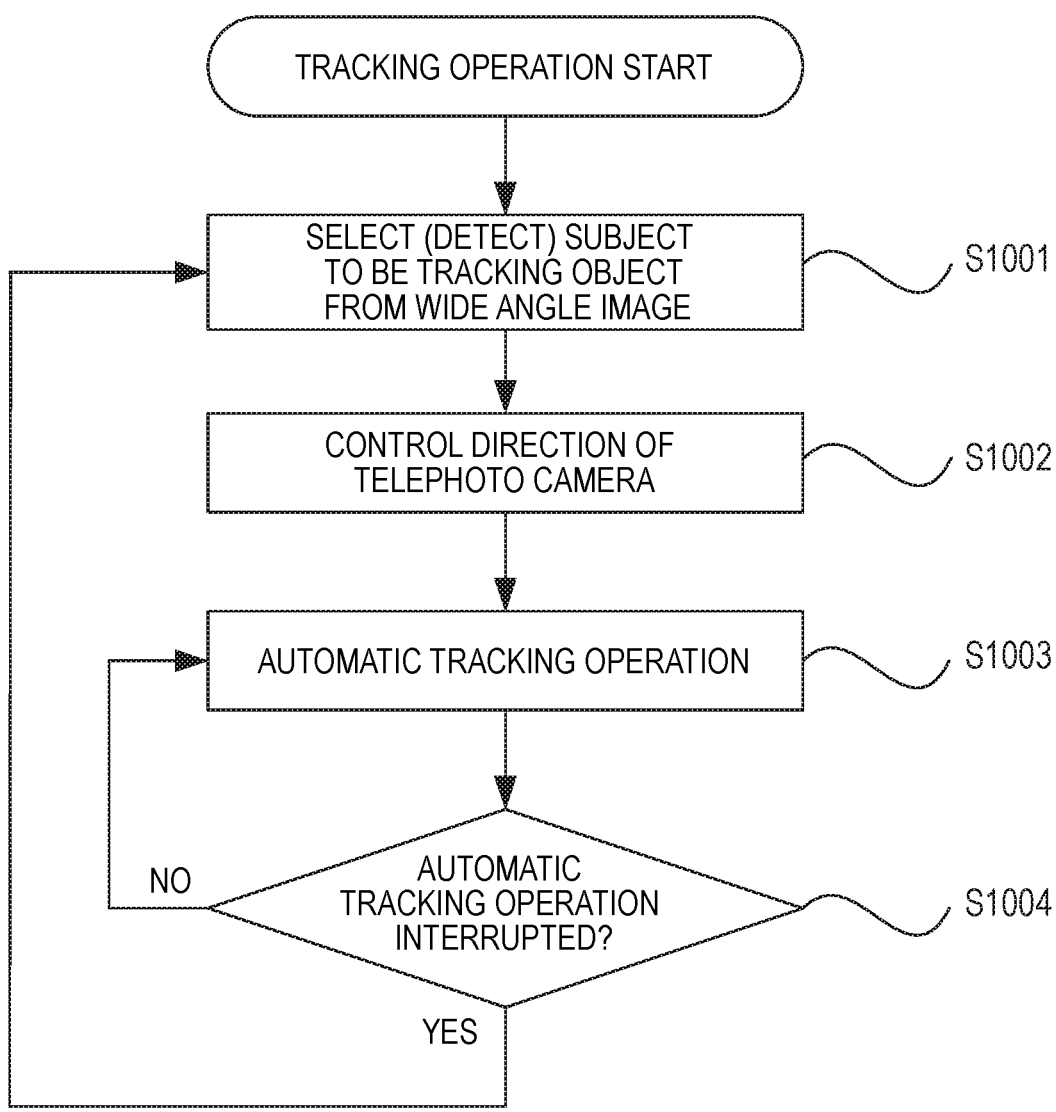
FIG. 11 is a flowchart illustrating a tracking operation of an imaging device of a comparative example.

In the imaging device of the comparative example, in step S1001 of FIG. 11, a subject to be a tracking object is selected from a wide angle image. The subject to be a tracking object is automatically set by moving-object detection. Next, in step S1002, the imaging device of the comparative example controls the capturing direction of the telephoto camera so as to be able to capture a subject to be a tracking object by using the telephoto camera. Specifically, the direction of a subject of a tracking object selected from a wide angle image is selected based on the positional relationship of the wide angle camera and the telephoto camera, and a drive mechanism is controlled so that the capturing direction of a telephoto camera is directed to the direction of the subject of the tracking object.

Subsequently, in step S1003, the imaging device of the comparative example acquires motion information on a subject to be a tracking object from the detail image, sequentially changes the capturing direction of a telephoto camera to follow the motion of the subject, and thereby continues tracking of the subject of the tracking object. Hereafter, such a tracking operation is referred to as an automatic tracking operation. In the imaging device, when disturbance such as vibration is applied to the telephoto camera or the motion of a subject of a tracking object sharply changes during the automatic tracking operation in step S1003, the subject of the tracking object may move out of the capturing view angle of the telephoto camera. As a result, for example, when the automatic tracking operation is interrupted, the imaging device of the comparative example determines that the automatic tracking operation is interrupted in step S1004, transfers the process back to step S1001, and uses a wide angle image captured by the wide angle camera to re-detect the subject of the tracking object. The imaging device of the comparative example continues such a flow operation until an instruction of stopping the automatic tracking operation is input by the user.

Problem in Imaging Device of Comparative Example

As discussed above, when an automatic tracking operation using a telephoto camera is interrupted, the imaging device of the comparative example re-detects the subject of the tracking object from a wide angle image acquired by the wide angle camera to maintain tracking accuracy as a whole of the imaging device. However, the use of this scheme may reduce the tracking accuracy for some update frequencies of wide angle images and detail images. For example, when the update frequency of wide angle images is lower (time interval of update is longer) than the update frequency of detail images, a wide angle image at the time when the automatic tracking operation is interrupted is not necessarily acquired. Thus, a certain delay time may occur after a subject of a tracking object is lost sight of and before the subject is again found. Furthermore, when motion of the subject of the tracking object is sharply changed during the delay time, it will be difficult to again find the subject of the tracking object. This is because such a sharp change of the position of the subject of the tracking object during the delay time makes it difficult to detect where in a wide angle image the subject of the tracking object is located.

Comparison with Imaging Device of the Present Embodiment

In contrast, the imaging device 100 of the present embodiment is adapted to control the update frequency of the wide angle image 101 acquired by the first imaging unit 110 in accordance with a probability of interruption of an automatic tracking operation using the second imaging unit 120. Specifically, the imaging device 100 of the present embodiment calculates the probability of interruption of an automatic tracking operation based on at least one of a state of the second imaging unit 120 and information included in the detail image 102 acquired by the second imaging unit 120. The imaging device 100 then controls the update frequency of the wide angle image 101 to be higher (that is, the time interval of update to be shorter) when the probability of interruption of the automatic tracking operation is greater than or equal to a predetermined threshold than when the probability of interruption of the automatic tracking operation is less than the predetermined threshold.

Such a configuration enables the imaging device 100 of the present embodiment to shorten the time required until re-detecting a tracking object when the automatic tracking operation is interrupted and the tracking object is lost sight of, and as a result, this facilitates restart of tracking of the tracking object. That is, the imaging device 100 of the present embodiment can improve the tracking accuracy as a whole of the imaging device compared to the imaging device of the comparative example.

Flowchart of Imaging Device of the Present Embodiment

With reference to the flowchart of FIG. 3, a tracking operation in the imaging device 100 of the present embodiment will be described below in detail. Note that the process of the flowchart of FIG. 3 can be implemented by the control unit 130 formed of, for example, a CPU executing a control program according to the present embodiment. The control program according to the present embodiment may be prepared in a non-volatile memory (not illustrated) or the like in advance or may be expanded to the memory or the like via a network or a storage medium.

In step S101 of FIG. 3, the imaging device 100 of the present embodiment selects (determines) a subject to be a tracking object from the wide angle image 101 acquired by the first imaging unit 110 and combined by the combining process unit 114. Also in the present embodiment, in the same manner as described above, a subject to be a tracking object is set automatically by moving-object detection. Next, in step S102, the control unit 130 controls the capturing direction and focusing of the second imaging unit 120 so that a subject of a tracking object can be captured by the second imaging unit 120. Specifically, the control unit 130 calculates the direction of a subject of a tracking object determined from the wide angle image 101 based on the positional relationship between the first imaging unit 110 and the second imaging unit 120. The control unit 130 then controls the drive mechanism 124 such that the capturing direction of the second imaging unit 120 is directed to the direction of the subject of the tracking object. Further, the control unit 130 controls the zoom and focus mechanism 125 so that the second imaging unit 120 can capture an image focused on the subject of the tracking object.

Next, in step S103, the control unit 130 acquires motion information of the subject of the tracking object calculated from the detail image 102 by the signal processing unit 126, controls the capturing direction and focusing of the second capturing unit 120, and thereby performs an automatic tracking operation. Further, at this time, the control unit 130 calculates a probability of interruption of the automatic tracking operation based on at least one of the state of the second imaging unit 120 and the information included in the detail image 102 acquired by the second imaging unit 120.

Acquisition Process of Probability of Interruption of Automatic Tracking Operation An example of acquisition of a probability of interruption of an automatic tracking operation will be described by using FIG. 4. FIG. 4 is a table illustrating a relationship between a state of the second imaging unit 120 or information included in a detail image acquired by the second imaging unit 120 and the probability of interruption of an automatic tracking operation. As illustrated in FIG. 4, the state of the second imaging unit 120 means a view angle, for example, and may be a wide angle state (view angle is wide) or a telephoto state (view angle is narrow). Further, the information included in the detail image acquired by the second imaging unit 120 is information indicating the size or the motion speed of a subject of a tracking object in a detail image, for example, and may be a case where a subject is small or large or a case where motion of a subject is slow or fast.

It is here considered that the probability of a subject of a tracking object moving out of the capturing view angle of the second imaging unit 120 is higher when the capturing view angle of the second imaging unit 120 is narrower (closer to the telephoto side). Further, it is considered that the probability of a subject of a tracking object moving out of the capturing view angle of the second imaging unit 120 is higher when the size of the subject of the tracking object is larger or the motion speed of the subject of the tracking object is faster within a detail image. It is then considered that the probability of interruption of an automatic tracking operation will be a higher value when the probability of a subject of a tracking object moving out of the capturing view angle of the second imaging unit 120 is higher. The control unit 130 of the present embodiment calculates the probability of interruption of an automatic tracking operation based on a correspondence table of respective values of the capturing view angle of the second imaging unit 120, the size of a subject of a tracking object within a detail image, and the speed of the subject of the tracking object within the detail image, and the probability of interruption of an automatic tracking operation as illustrated in FIG. 4.

In step S103 of FIG. 3, the control unit 130 acquires the probability of interruption of an automatic tracking operation by using the correspondence table as illustrated in FIG. 4 and, based on the probability value, controls the update frequency of the wide angle image 101. Specifically, the control unit 130 controls the update frequency of the wide angle image 101 to be higher (time interval of update to be shorter) when the probability of interruption of the automatic tracking operation is greater than or equal to a predetermined threshold than when the probability of interruption of the automatic tracking operation is less than the predetermined threshold. Note that the predetermined threshold may be set to any value from 0 to 1 and may be selected and set by the user. Note that, when the predetermined threshold is set to 1, the control unit 130 does not perform control of changing the update frequency on the wide angle image regardless of the probability of interruption of an automatic tracking operation. On the other hand, when the predetermined threshold is set to 0, the control unit 130 increases the update frequency of the wide angle image regardless of the probability of interruption of an automatic tracking operation.

Control Method of Changing Update Frequency by Reduction/Addition

Figure 5A:
FIG. 5A and FIG. 5B are diagrams illustrating a reduction mode and an addition mode of solid state image pickup devices.
Figure 5B:

As a control scheme of changing the update frequency of the wide angle image 101, a method of changing a mode of signal readout from the solid state image pickup devices 113*a* to 113*d* can be used, for example. The specific example thereof will be described by using FIG. 5A and FIG. 5B. FIG. 5A and FIG. 5B are diagrams illustrating arrangement of pixels corresponding to respective colors of R, G (Gr, Gb), and B when the pixel arrangement of a solid state image pickup device is the so-called RGB Bayer arrangement. While examples in which a solid state image pickup device has eight pixels in the vertical direction and eight pixels in the horizontal direction are illustrated in FIG. 5A and FIG. 5B to simplify the illustration, the actual number of pixels is not limited to this example.

The example of FIG. 5A represents a reduction mode in which pixel signals are read out every two pixels vertically and horizontally. In the reduction mode, only the pixel signals of four pixels of R, G (Gr, Gb), and B provided with the same pattern in two pixels aligned vertically by two pixels aligned horizontally in FIG. 5A are readout. As a result, the number of pixel signals read out in the reduction mode is reduced to a quarter compared to the all-pixel readout mode in which all the signals of all the pixels are read out. The example of FIG. 5B represents an addition mode in which a pixel signal is read out by adding and averaging two pixels aligned vertically by two pixels aligned horizontally. In the addition mode, pixel signals of four pixels provided with the same pattern in the same color out of the pixels of R, G (Gr, Gb), B in FIG. 5B are added and averaged, and thereby a single pixel signal is output. Thus, also in the addition mode, in the same manner as in the reduction mode, the number of pixel signals to be read out is reduced to a quarter compared to the all-pixel readout mode. Therefore, the update frequency of the wide angle image 101 can be higher (time interval of update can be shorter) when the reduction mode or the addition mode is used to read out signals from sloid state image pickup devices than when the all-pixel readout mode is used. Note that signal readout in the reduction mode or the addition mode can be implemented by using a horizontal scanning circuit or a vertical scanning circuit provided to the solid state image pickup devices 113*a* to 113*d* to select pixels to be read out.

Timing Chart

FIG. 6A and FIG. 6B are timing charts illustrating the timing of signal readout from the solid state image pickup devices 113*a* to 113*d* and the duration of time required for a combining process in the combining processing unit 114. FIG. 6A illustrates a case of where readout is performed in the all-pixel readout mode, and FIG. 6B illustrates a case where the number of signals to be read out is reduced by the reduction mode or the addition mode.

In the case of the all-pixel readout mode, since signals of all the pixels are read out in the solid state image pickup devices 113*a* to 113*d*, respectively, the signal readout time per one frame of each of the solid state image pickup devices 113*a* to 113*d* is time period T101*a* of FIG. 6A. Further, since a combining process using signals of all the pixels read out from the solid state image pickup devices 113a to 113d is performed in the combining processing unit 114, the time required for a combining process is time period T102a of FIG. 6A. Thus, in the all-pixel readout mode, time period T103a that is a sum of the time period T101a for pixel readout and the time period T102a for a combining process is the time required for update.

In contrast, when the reduction mode or the addition mode is used, the number of pixel signals to be read out is reduced to a quarter as described above. Thus, when the reduction mode or the addition mode is used, the signal readout time per one frame of each of the solid state image pickup devices 113a to 113d is time period T101b of FIG. 6B. That is, when the reduction mode or the addition mode is used, since the number of pixel signals to be read out decreases, the signal readout time period T101b per one frame is shorter than the signal readout time period T101a in the all-pixel readout mode of FIG. 6A, as illustrated in FIG. 6B. Further, when the reduction mode or the addition mode is used, the time required for a combining process of the combining processing unit 114 is time period T102b of FIG. 6B. That is, when the reduction mode or the addition mode is used, the time period T102b required for a combining process is also shorter than the combining process time period T102a in the all-pixel readout mode, as illustrated in FIG. 6B. When the reduction mode or the addition mode is used, since the resolution of images acquired by the imaging units 111a to 111d decreases and the number of pixels is reduced, calculation load of template matching during a combining process is reduced resulting in a shorter time required for a combining process.

Further, the time required for update when the reduction mode or the addition mode is used is time period T103b that is a sum of the time period T101b for pixel readout and the time period T102b for a combining process. That is, when the reduction mode or the addition mode is used, the time period T103b required for reading out one frame of a wide angle image is shorter than the time period T103a when the all-pixel readout mode is used. Thereby, in the present embodiment, when the reduction mode or the addition mode is used, the update frequency of a wide angle image can be improved. As discussed above, the imaging device 100 of the present embodiment increases the update frequency (shortens the update period) of a wide angle image by performing signal readout in the reduction mode or the addition mode on the solid state image pickup devices 113a to 113d when the probability of interruption of an automatic tracking operation is greater than or equal to a predetermined threshold.

Difference Between Reduction Mode and Addition Mode

In the present embodiment, any of the reduction mode and the addition mode described above may be used. In the reduction mode, since the substantial pixel aperture ratio is smaller than in the addition mode, the resolution of an image is improved. Thus, when the resolution of an image is more important, it is preferable to use the reduction mode. On the other hand, the S/N ratio is more improved than in the reduction mode due to an averaging effect when the addition mode is used. Thus, when the S/N ratio is more important, it is preferable to use the addition mode. Note that, when the reduction mode or the addition mode is used to reduce the signal readout time period T101, the maximum charge accumulation time of each pixel in a solid state image pickup device is shortened. Thus, when the luminance of a subject is low, in particular, it is preferable to use the addition mode to improve the S/N ratio.

Advantageous Effect of the Present Embodiment

Now, turning back to the flowchart of FIG. 3. During an automatic tracking operation of step S103 of FIG. 3, there may be a case where a subject of a tracking object moves out of the capturing view angle of the second imaging unit 120 and an automatic tracking operation is interrupted due to application of disturbance such as vibration to the imaging device 100 or a sharp change in motion of the subject of the tracking object. Thus, in step S104, the control unit 130 determines whether or not the automatic tracking operation is interrupted and, if the automatic tracking is not interrupted, transfers the process back to step S103 to continue the automatic tracking. On the other hand, if it is determined that the automatic tracking operation is interrupted in step S104, the control unit 130 transfers the process back to step S101 to detect the subject of the tracking object using the wide angle image 101. The control unit 130 continues such a process of the flowchart illustrated in FIG. 3 until the user input an instruction of stopping the automatic tracking operation.

In the imaging device 100 of the present embodiment, the update frequency of the wide angle image 101 is higher when the probability of interruption of an automatic tracking operation is greater than or equal to a predetermined threshold than when the probability of interruption of an automatic tracking operation is less than the predetermined threshold in step S103 as described above. Thus, even when an automatic tracking operation is interrupted in step S104, delay time before the subject of the tracking object is again found can be shortened. As a result, according to the imaging device 100 of the present embodiment, it is easier to again find a subject of a tracking object, and it is possible to improve tracking accuracy as a whole of the imaging device.

Example of Method of Selecting Subject of Tracking Object

In the present embodiment, selection of a subject of a tracking object performed in step S101 of FIG. 3 may be performed automatically by the moving-object detection described above or may be performed manually by the user. When a subject of a tracking object is automatically set, the imaging device 100 may perform a moving-object object detection process of detecting a moving object by comparing multiple frames of the wide angle images 101, as described above. On the other hand, when the user manually selects a subject of a tracking object, the user selects a subject of a tracking object from a wide angle image displayed on a screen of an external client device, for example. The result of selection by the user is then transmitted from the external client device to the imaging device 100 via a network. The imaging device 100 of this case sets the subject manually selected by the user as a tracking object.

Example of Direction Control of Second Imaging Unit by Drive Mechanism

In the present embodiment, it is desirable that the center 115 of the wide angle image 101 match the rotation center 127 of the drive mechanism 124 when the capturing direction of the second imaging unit 120 is controlled based on the positional relationship of the first imaging unit 110 and the second imaging unit 120 in step S102 of FIG. 3. The positional relationship of the center 115 of the wide angle image 101 and the rotation center of the drive mechanism 124 will be described below by using FIG. 7A and FIG. 7B. The center 115 of the wide angle image 101 as used herein means a point where optical axes of the image-formation optical systems 112a to 112d of the plurality of imaging units 111a to 111d intersect with each other.

Figure 7B:
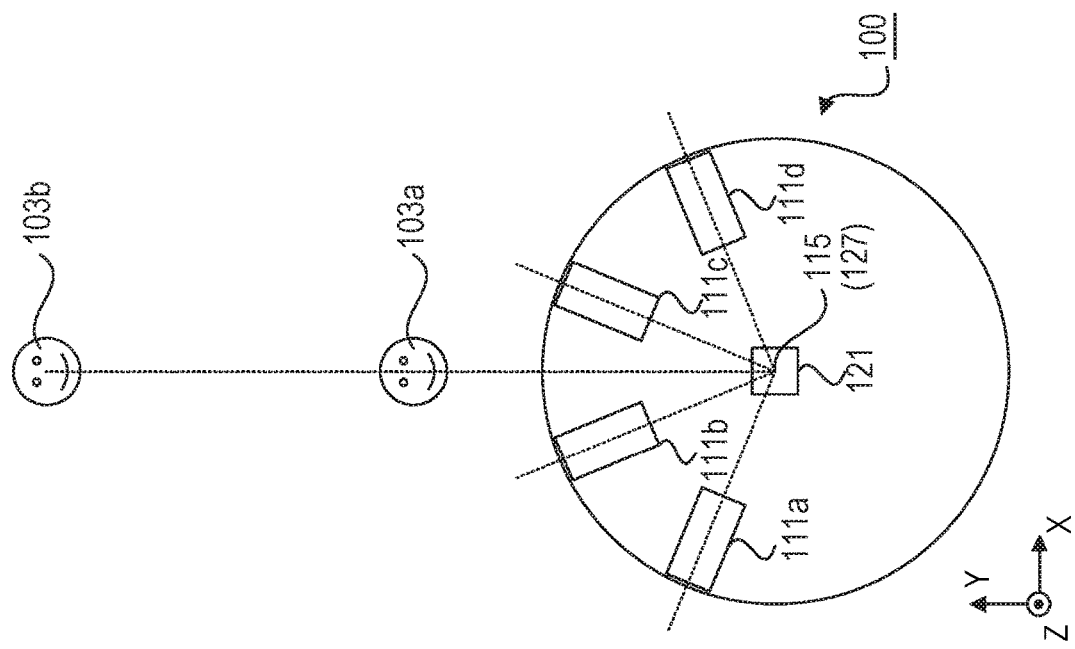
FIG. 7A and FIG. 7B are diagrams illustrating a positional relationship of the center of a wide angle image and the center of a drive mechanism.
Figure 7A:
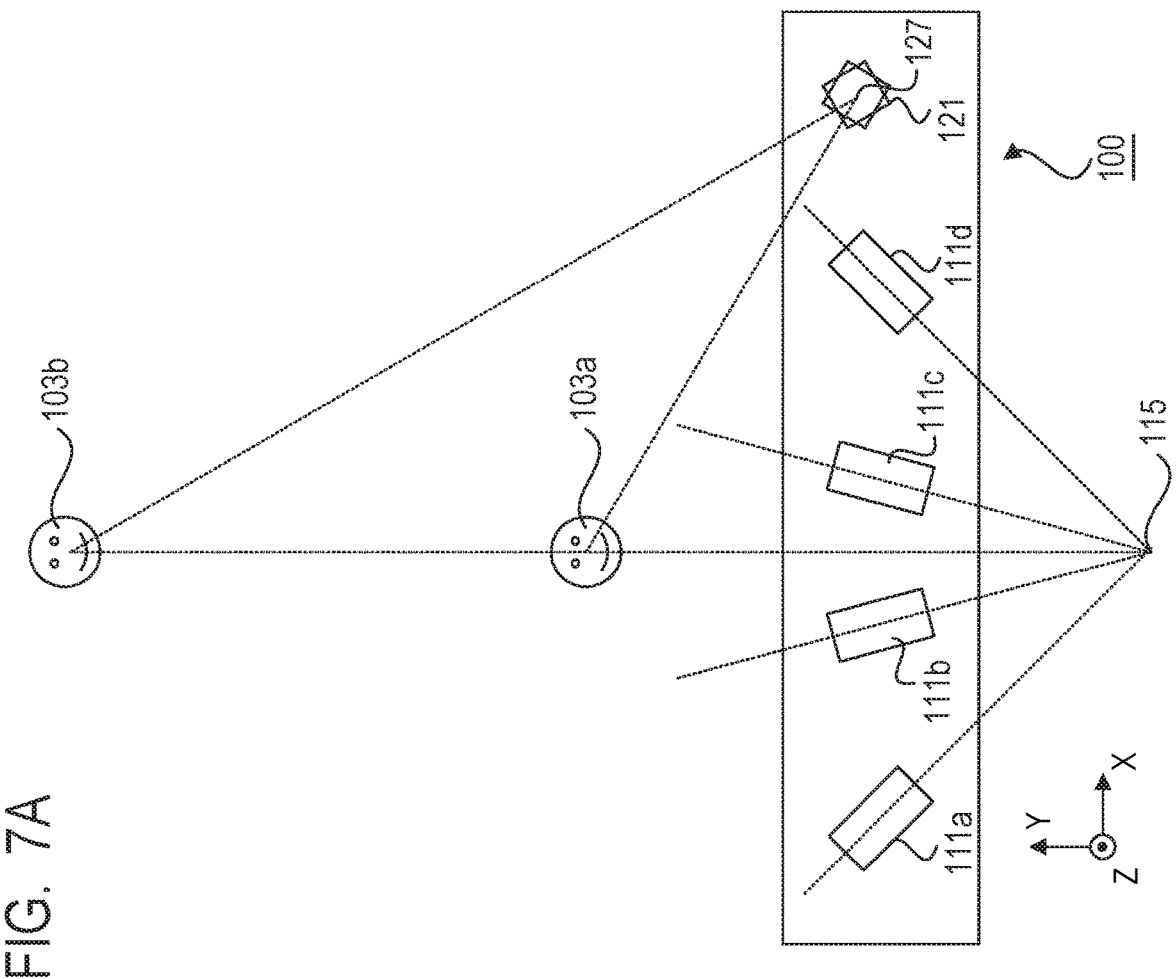

As illustrated in FIG. 7A, when the center 115 of the wide angle image 101 does not match the center 127 of the drive mechanism 124, the direction in which the second imaging unit 120 is to be directed varies depending on the distance from the center 127 of the drive mechanism 124 to subjects (103a, 103b). On the other hand, as illustrated in FIG. 7B, when the center 115 of the wide angle image 101 matches the center 127 of the drive mechanism 124, the direction in which the second imaging unit 120 is to be directed is constant regardless of the distance from the center 127 of the drive mechanism 124 to subjects (103a, 103b). As a result, when the center 115 of the wide angle image 101 matches the center 127 of the drive mechanism 124, it is easier to control the direction of the second imaging unit 120 in step S102 of FIG. 3.

Note that it is not necessary that the center 115 of the wide angle image 101 and the center 127 of the drive mechanism 124 are exactly matched to each other, and slight displacement due to attachment error may be tolerated. Further, the center 115 of the wide angle image 101 and the center 127 of the drive mechanism 124 may be matched to each other within a plane (within the X-Y plane of FIG. 7A and FIG. 7B) perpendicular to a direction (the Z-axis side in FIG. 7A and FIG. 7B) in a narrow capturing angle of the wide angle image 101.

Example of Controlling Update Frequency in Combining Process

While the update frequency of the wide angle image 101 is controlled by changing the signal readout mode of the solid state image pickup devices 113a to 113d as illustrated in FIG. 5A and FIG. 5B as an example in step S103 of FIG. 3, other methods may be used as a method of controlling the update frequency. For example, the time period T102 required for a combining process may be controlled by controlling the load of a combining process in the combining processing unit 114. For example, in the combining processing unit 114, down-sampling and then template matching are performed when a wide angle image is generated from pixel signals read out from the solid state image pickup devices 113a to 113d. By reducing the resolution of an image by down-sampling in such a way, it is possible to reduce the calculation load of template matching of a combining process. That is, reduction in the load of a combining process enables a higher update frequency.

Control of Update Frequency in Compressing Process

While the example in which the update frequency is reduced because of the time required for a combining process resulting in delay of re-detection of a subject of a tracking object has been illustrated in the above embodiment, it is considered that, for example, when a combining processing performance is high, influence of a combining process on the delay of re-detection of a subject of a tracking object is significantly reduced. Therefore, when the update frequency of the wide angle image is reduced due to other factors than a combining process, it is desirable to control the update frequency of a wide angle image by using other method than the example described above.

For example, the update frequency may be reduced due to a transfer process in the transfer unit 140. In general, since a higher resolution image is required when a wide view angle is captured, it is preferable that the resolution of the wide angle image 101 be higher than the resolution of the detail image 102. In this way, when the resolution of the wide angle image 101 is higher than the resolution of the detail image 102, the update frequency may be reduced due to a transfer process performed by the transfer unit 140. Because the higher the resolution is, the more the data amount used for transferring a single image is required. Accordingly, when the update frequency of an image is reduced due to delay in a transfer process performed by the transfer unit 140, a compression process is performed on the wide angle image 101 before the transfer. That is, by performing a compression process on the wide angle image 101 to reduce the amount of transferred data, it is possible to reduce the delay at a transfer process performed by the transfer unit 140 and suppress reduction in the update frequency of images. Note that the compression process of the wide angle image 101 may be performed by the combining processing unit 114 or the transfer unit 140.

Example of Control of Degree of Update Frequency of Images

While an example in which whether or not to control the update frequency of wide angle images is determined in accordance with the probability of interruption of an automatic tracking operation being greater than or equal to a predetermined threshold or being less than the predetermined threshold has been illustrated in the above embodiment, the update frequency of wide angle images may be controlled stepwise in accordance with the probability of interruption of an automatic tracking operation. Specifically, control may be such that the higher the probability of interruption of an automatic tracking operation is (the lower the probability of successfully continuing tracking by an automatic tracking operation is), the higher the update frequency of wide angle images is (the shorter the update time interval is). The control of the update frequency in this case may use a scheme of reducing stepwise the number of pixel signals read out from solid state image pickup devices, reducing stepwise the resolution in down-sampling, reducing stepwise the data size in a compression process, or the like in accordance with the probability value of interruption of an automatic tracking operation.

Description of Other Advantages

As described above, the data size of the wide angle image 101 can be reduced when the reduction mode or the addition mode is applied, down-sampling is performed before a combining process, or a compression process is performed before transfer. When the data size of the wide angle image 101 is reduced in such a way, reduction in load of network communication can reduce power consumption, and usage of a storage capacity on the client device side can also be reduced.

Further, the resolution of the wide angle image 101 may decrease when application of the reduction mode or the addition mode, down-sampling before a combining process, a compression process before transfer, or the like is performed. Even when the resolution of the wide angle image 101 is reduced, however, improvement of update frequency of the wide angle image 101 instead allows improvement of tracking accuracy as a whole of the imaging device. The reason for this will be described below.

In general, it is considered that reduction in the resolution of an image will result in a higher probability of losing sight of small inward motion of a subject within a screen. On the other hand, it is considered that, even with a reduced resolution of an image, this will allow for a lower probability of losing sight of large inward motion of a subject within a screen. The case where a subject of a tracking object moves out of a capturing view angle of the second imaging unit 120 and an automatic tracking operation is interrupted means a case where the subject of the tracking object moves widely within the wide angle image 101. Therefore, even with the reduced resolution of the wide angle image 101, this allows for a lower probability of losing sight of a subject moving widely within the wide angle image 101. On the other hand, when a subject of a tracking object moves slightly within the wide angle image 101, the automatic tracking operation can be continued. Thus, even when the resolution of the wide angle image 101 is reduced, improvement of update frequency of the wide angle image 101 instead allows for improvement of tracking accuracy as a whole of the imaging device.

Example of Number of First Imaging Unit

While FIG. 1B illustrates an example in which the first imaging unit 110 is formed of the four imaging units 110a to 110d, the first imaging unit 110 is not necessarily required to be formed of four imaging units. For example, the first imaging unit may be formed of a single imaging unit or may be formed of two, three, or five or more imaging units. Further, the capturing range of the first imaging unit 110 may not be the range illustrated in FIG. 1B but may be the entire circumference of 360 degrees, for example. A wider capturing range of the first imaging unit 110 allows for a higher probability of successfully re-detecting a subject of a tracking object, which is more preferable.

When the first imaging unit is formed of a single imaging unit, for example, since a combining process of images captured by a plurality of imaging units is no longer necessary, the load of a process and the time required for the process can be reduced. However, even though the first imaging unit is formed of a single imaging unit, it is preferable that the resolution of the wide angle image 101 captured by the first imaging unit be higher than the resolution of the detail image 102 captured by the second imaging unit. Because a higher resolution image is required when a wider view angle is captured. Note that, when the first imaging unit is formed of a single imaging unit capable of capturing a wide angle image, the size of an image-formation optical system or a solid state image pickup device may be increased, or the manufacturing cost thereof may increase. Thus, in terms of size or manufacturing cost of an imaging device, it is preferable that the first imaging unit be formed of a plurality of imaging units. Further, when the first imaging unit is formed of a single imaging unit, no combining process is necessary, and no reduction in the update frequency of the wide angle image 101 will occur. In this case, to increase the update frequency of the wide angle image 101, the reduction mode or the addition mode can be applied to a solid state image pickup device, or a compression process can be performed before transfer.

Other Configuration Examples of Second Imaging Unit

While FIG. 2 illustrates the example in which the second imaging unit 120 has the zoom and focus mechanism 125, the zoom mechanism may not be provided. When the zoom mechanism is provided, however, it is possible to acquire the detail image 102 with such a capturing view angle that allows easier detection of motion of a subject of a tracking object regardless of the distance to or the size of the subject of a tracking object. This advantageously allows for a lower probability of interruption of an automatic tracking operation. Further, when a zoom mechanism is provided, it is more preferable to provide a function of automatically adjusting the capturing view angle in accordance with the size of a subject of a tracking object.

When the second imaging unit 120 has no zoom mechanism, in step S103 of FIG. 3, information on the capturing view angle of the second imaging unit 120 of FIG. 4 is not used, but one or more pieces of information on the size and the speed of a subject of a tracking object are used to calculate the probability of interruption of an automatic tracking operation. Then, when the probability of interruption of an automatic tracking operation is high, the update frequency of a wide angle image is increased.

Other Examples of Transfer Unit

While FIG. 2 illustrates the case where the single transfer unit 140 is used and the wide angle image 101 or the detail image 102 is selected by a switch and thereby transferred sequentially to the same network, such a configuration is not necessarily required to be employed. However, it is preferable to deliver the image via the same network because the correspondence between the wide angle image 101 and the detail image 102 can be easily recognized.

Other Examples of Tracking Function

While FIG. 2 illustrates the example in which the second imaging unit 120 has a signal processing unit 126 and signal processing unit 126 detects a motion vector of a subject, the client device side may have a function of detecting a motion vector. In this case, the capturing direction or the like of the second imaging unit 120 can be controlled by transferring the detail image 102 to the client device and using information on the motion vector detected by the client device side to control the drive mechanism 124.

Presence or Absence of Network

FIG. 2 illustrates the example in which the imaging device 100 has the transfer unit 140, transfers an image to the client device side, and operates by using an instruction from the client device side. In contrast, for example, the imaging device 100 may have a memory device that stores image data, a viewer that displays an image, and an interface unit that accepts a user instruction. Further, the imaging device 100 may have any one or two or all of the memory device, the viewer, and the interface unit.

Second Embodiment

Figure 8:
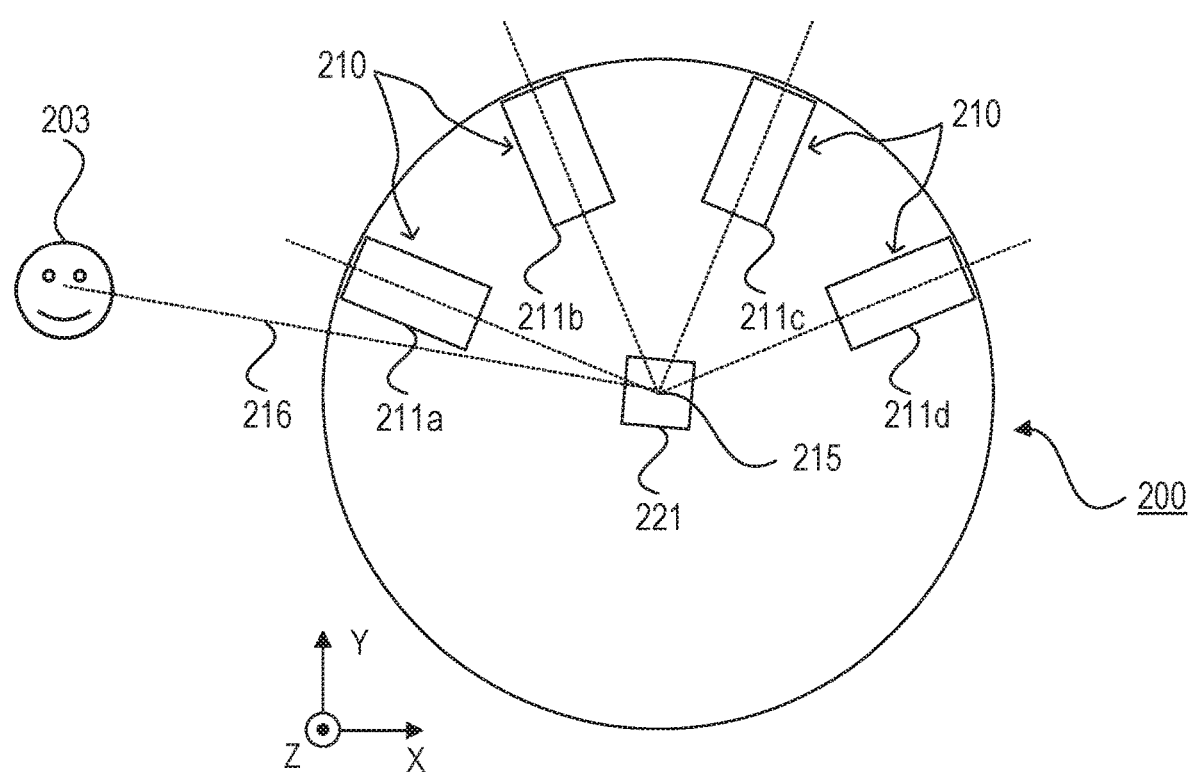
FIG. 8 is a diagram illustrating a general configuration of an imaging device of a second embodiment.

FIG. 8 is a diagram illustrating a general configuration of an imaging device 200 of the second embodiment, which is an arrangement diagram of the imaging device 200 when viewed from the upper side (+Z-axis side). Note that the functional block inside the imaging device 200 of the second embodiment is the same as that of FIG. 2 described above. The imaging device 200 of the second embodiment is different from the imaging device 100 of the first embodiment in that the update frequency of images is controlled in accordance with an angle of the capturing direction of an imaging unit relative to the direction of a subject of a tracking object. A first imaging unit 210 of the imaging device 200 of the second embodiment is formed of a plurality of imaging units 211a to 211d in a similar manner to the first imaging unit 110 of the imaging device 100 illustrated in FIG. 1B. Further, similarly, the imaging device 200 of the second embodiment combines images acquired by the plurality of imaging units 211a to 211d to generate a wide angle image. The imaging device 200 of the second embodiment then changes a signal readout frequency from each of the imaging units 211a to 211d in accordance with the angle of the capturing direction of each of the imaging units 211a to 211d relative to the direction of a subject of a tracking object. To change the frequency of signal readout from the plurality of imaging units 211a to 211d, pixel signals may be read out from solid state image pickup devices by using the reduction mode or the addition mode as described above.

FIG. 8 illustrates a positional relationship of the direction of a subject 203 to be a tracking object and the plurality of imaging units 211a to 211d. As illustrated in FIG. 8, the imaging units 211a, 211b, 211c, and 211d are arranged in ascending order of the angle of the capturing direction relative to the direction of the subject 203 of a tracking object. The direction of the subject 203 as used herein means that the direction of a line 216 that connects the center 215 of a wide angle image to the centroid of the subject 203.

Case of Small Angle Relative to Direction of Subject of Tracking Object

Also in the second embodiment, in the same manner as described above, a case where an automatic tracking operation is interrupted means a case where a subject of a tracking object moves out of the capturing view angle of the second imaging unit 120 due to application of disturbance such as vibration to the second imaging device 200 or sharp change of motion of a subject of a tracking object. Thus, even when the subject 203 of a tracking object moves out of the capturing view angle of the second imaging unit 120 and is lost sight of, the subject 203 is highly likely to be located within an angle range close to the direction of the subject immediately before lost sight of and less likely to be located at an angle far from it.

Accordingly, for the imaging unit 211a or 211b located at which the angle relative to the direction of the subject 203 of a tracking object is small, the control unit 130 of the second embodiment reduces the number of pixel signals to be read out to reduce delay time after a subject of a tracking object is lost sight of and before the subject is again found. On the other hand, for the imaging unit 211c or 211d located at which the angle relative to the direction of the subject 203 of a tracking object is large, the control unit 130 of the second embodiment reads out pixel signals without reducing the number thereof to acquire an image with a high resolution.

Thereby, in the second embodiment, it is possible to avoid reduction in the probability of successfully re-detecting the missed subject 203 of a tracking object in an automatic tracking operation and obtain a wide angle image with an improved resolution in the direction of a larger angle relative to the direction of the subject 203 of the tracking object. As a result, according to the second embodiment, it is possible to improve the visibility of a subject in a direction different from the direction of a subject of a tracking object while improving tracking accuracy as a whole of the imaging device.

Example of Control of Imaging Unit with Larger Angle Relative to Direction of Subject of Tracking Object On the other hand, in the second embodiment, the number of pixel signals to be read out by the imaging unit 211c or 211d located at which the angle is large relative to the direction of the subject 203 of a tracking object may be reduced, and pixel signals may be read out from the imaging unit 211a or 211b located at which the angle is small without reduction of the number thereof. In this way, when the number of pixel signals to be read out by the imaging unit 211a or 211b located at which the angle relative to the direction of the subject 203 of a tracking object is small is not reduced, the probability of successfully again find the subject of the tracking object can be further improved. The reason for this will be described below.

As described above, the probability of losing sight of small inward motion of a subject within a screen is higher for a lower resolution of an image. In other words, for a larger motion of a subject of a tracking object, the probability of successfully again finding the tracking object is higher even when the resolution of an image is reduced. Therefore, when a subject moves into the capturing view angle of the imaging units 211a or 211b located at which the angle relative to the direction of the subject 203 of the tracking object is small, since the amount of motion of the subject is small, readout without reduction in a resolution allows for a higher probability of successfully re-detecting the subject. On the other hand, when a subject moves into the capturing view angle of the imaging units 211c or 211d located at which the angle relative to the direction of the subject 203 of the tracking object is large, since the amount of motion of the subject is large, the number of pixel signals to be read out to is reduced, and thereby the update frequency of wide angle images is improved. As discussed above, in the second embodiment, it is possible to further improve the tracking accuracy as a whole of the imaging device by controlling the number of signals to be read out by imaging units in accordance with the angle relative to the direction of a subject of a tracking object.

Note that the number of signals to be read out may be controlled for each of the imaging units 211a to 211d of the first imaging unit 210. By reducing the number of signals to be read out for an imaging unit having a smaller angle relative to the direction of a subject of a tracking object, it is possible to improve the visibility of a different subject in a direction different from the direction of a subject of a tracking object while improving tracking accuracy as a whole of the imaging device. On the other hand, by reducing the number of signals to be read out for an imaging unit having a larger angle relative to the direction of a subject of a tracking object, it is possible to further improve the probability of successfully re-detecting the subject of the tracking object.

Example of Hardware Configuration

Figure 9:
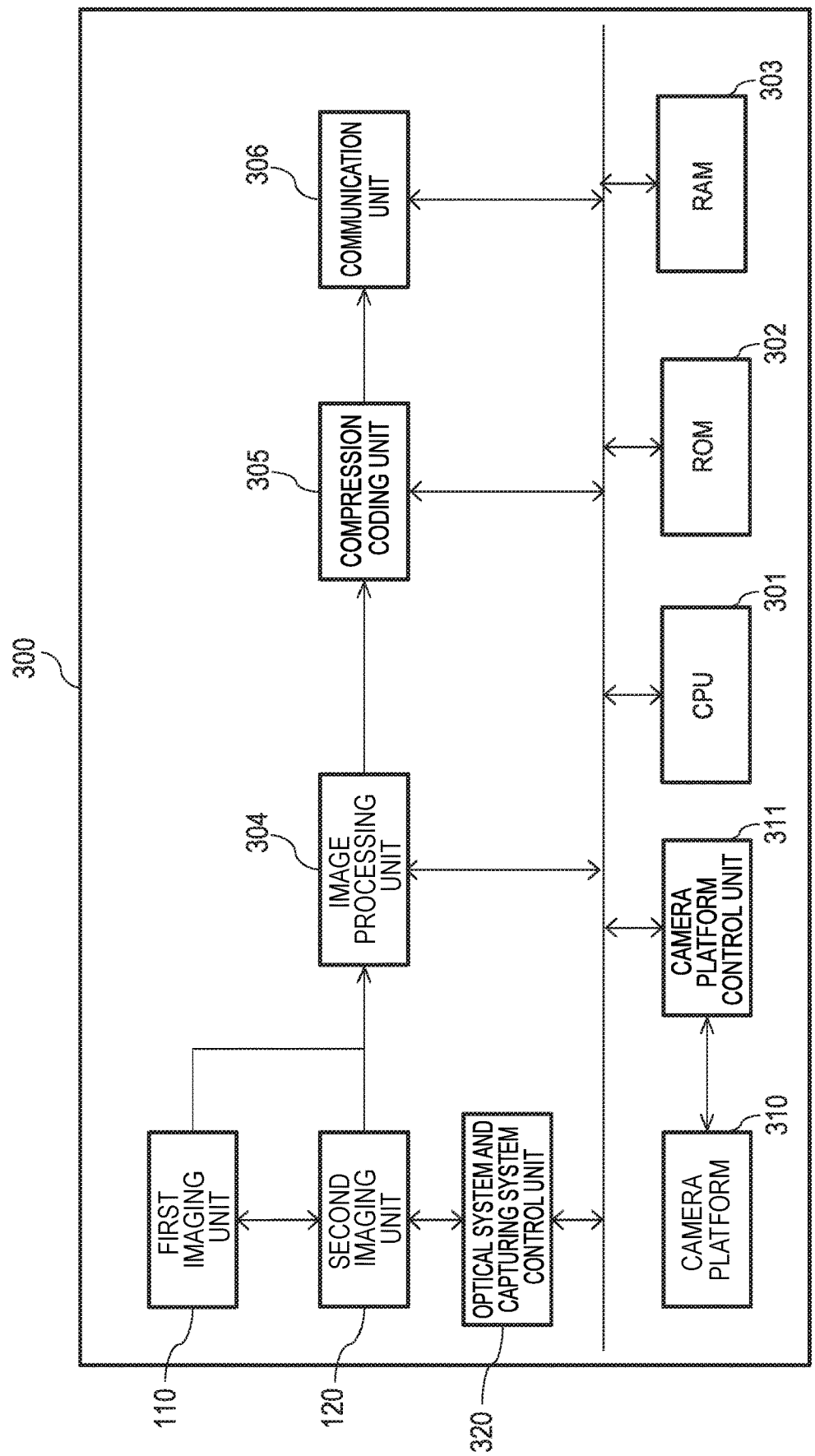
FIG. 9 is a diagram illustrating a hardware configuration example of the imaging device of the embodiments.

FIG. 9 is a diagram illustrating an example of a hardware configuration of an imaging device 300 of the present embodiment including the first imaging unit 110 and the second imaging unit 120 described above according to the present embodiment. In the imaging device 300 illustrated in FIG. 9, a CPU 301 executes a control program according to the present embodiment to control each unit of the hardware configuration. The imaging device 300 illustrated in FIG. 9 has the first imaging unit 110, the second imaging unit 120, an optical system and capturing system control unit 320, an image processing unit 304, a compression coding unit 305, a communication unit 306, the CPU 301, a ROM 302, a RAM 303, a camera platform control unit 311, and a camera platform 310.

The ROM 302 stores a control program according to the present embodiment and various parameters required for startup or operation of the imaging device 300, and the program and the parameters are read out when required. The RAM 303 is used as a work RAM and performs temporal storage of image data during expansion or processing of a program. The CPU 301 executes the control program expanded to the RAM 303 to control each unit of the imaging device 300 of the present embodiment and also performs various operations or the like. In the case of the present embodiment, the control and operation in the CPU 301 includes control of signal readout, control of a tracking operation, acquisition of a probability of interruption of a tracking operation, control of the reduction mode and the addition mode, control of a capturing direction and an imaging unit, control of an update frequency, control of transfer, and the like described above.

The first imaging unit 110 is a multi-view wide angle camera having the plurality of imaging units 111a to 111d illustrated in FIG. 2 described above. The second imaging unit 120 is a monocular telephoto camera illustrated in FIG. 2. The optical system and capturing system control unit 320 is an integrated circuit (IC) or the like used for driving and controlling the first imaging unit 110 or the second imaging unit 120. The optical system and capturing system control unit 320 performs the reduction or addition, the update control, or the like described above of the first imaging unit 110 or the drive control or the like of the zoom and focus mechanism 125 of the second imaging unit 120 as described above under the control of the CPU 301. Further, the optical system and capturing system control unit 320 controls driving of the focus mechanism provided in the first imaging unit 110. Each image data acquired by the multi-view wide angle camera of the first imaging unit 110 is transmitted to the imaging processing unit 304. Similarly, image data acquired by the monocular telephoto camera of the second imaging unit 120 is transmitted to the image processing unit 304.

The camera platform 310 is a camera platform having the drive mechanism 124 of FIG. 2 described above. The camera platform control unit 311 is a driver IC that supplies drive power or the like to the drive mechanism 124 of the camera platform 310. The camera platform control unit 311 supplies drive power to the drive mechanism 124 of the camera platform 310 under the control of the CPU 301 to control the capturing direction of the second imaging unit 120.

The image processing unit 304 and the compression coding unit 305 are made of a digital signal processor (DSP) or the like, for example. The image processing unit 304 performs various image processing such as a development process, white balance adjustment, or the like. Further, the image processing unit 304 performs the above-described combining process on each image data acquired by the multi-view wide angle camera of the first imaging unit 110, the above-described motion vector detection using image data acquired from the monocular telephoto camera of the second imaging unit 120, or the like. The image data on which image processing has been performed by the image processing unit 304 is transmitted to the communication unit 306 after compression coding by a predetermined compression scheme is performed by the compression coding unit 305. The image processing unit 304 and the compression coding unit 305 perform image processing and compression code processing under the control of the CPU 301.

The communication unit 306 corresponds to the transfer unit 140 of FIG. 2 described above and is a communication module such as a wired LAN, a wireless LAN, or the like. The communication unit 306 sends out image data compression-coded by the compression coding unit 305 to a client device via a network and, further, receives a command transmitted from the client device via the network and transmits the command to the CPU 301.

Figure 10:
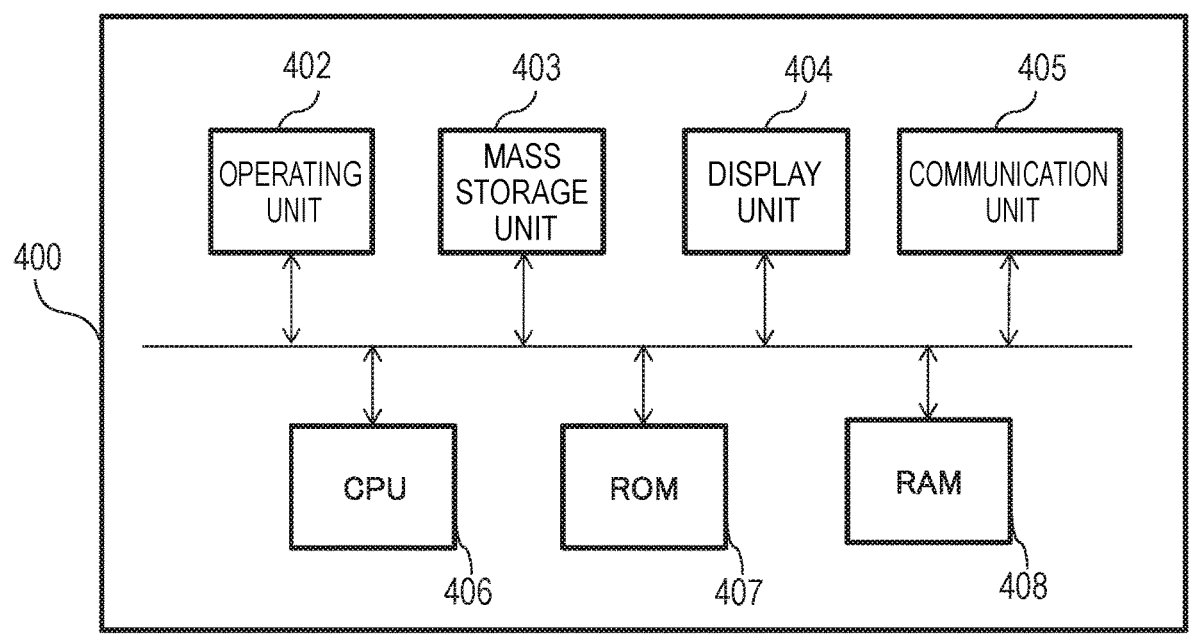
FIG. 10 is a diagram illustrating a hardware configuration example of a client device of the embodiments.

FIG. 10 is a diagram illustrating a general hardware configuration example of a personal computer (PC) as an example of a client device 400 according to the present embodiment. The client device 400 of the present embodiment has a CPU 406, a ROM 407, a RAM 408, an operating unit 402, a mass storage unit 403, a display unit 404, and a communication unit 405.

The operating unit 402 is a mouse, a keyboard, a touch-screen, or the like, for example, and accepts operation input from the user. The display unit 404 is a display device such as a liquid crystal panel, an organic EL panel, or the like and displays an image, a user interface image, or the like. The mass storage unit is a hard disk drive (HDD), a solid state drive (SDD), or the like and stores image data, a program, and the like. The communication unit 405 is a communication module such as a wired LAN, a wireless LAN, or the like, which is connected to the imaging device 300 of the present embodiment via a network and receives image data transmitted from the imaging device 300 or transmits a command or the like to the imaging device 300.

The ROM 407 stores a program for performing control of the imaging device 300, image display, or the like according to the present embodiment in the client device 400, and the program is read out from the ROM 407 and expanded to the RAM 408. The RAM 408 is used as a work RAM and performs temporal storage of various data during expansion or processing of the program. The CPU 406 executes the program expanded to the RAM 408 and performs various control or processes for the client device 400 of the present embodiment. For example, the CPU 406 performs various control and processes according to the present embodiment such as control that, upon receiving an instruction of an automatic tracking operation input from the user via the operating unit 402, generates a command for the automatic tracking operation and transmits the command from the communication unit 405 to the imaging device 300. Further, when compression-coded image data is transmitted from the imaging device 300, the CPU 406 extends and decodes the image data and transmits the extended and decoded image data to the display unit 404 for display.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-207076, filed Oct. 26, 2017, which is hereby incorporated by reference herein in its entirety.

What is claimed is:

1. An imaging device comprising:
a plurality of first imaging units;
a combining processing unit that combines images acquired by the plurality of first imaging units to generate a wide angle image;
a second imaging unit that captures a part of a region of the wide angle image, wherein a frequency of acquiring an image captured by the second imaging unit is higher than a frequency of acquiring the wide angle image; and
a control unit that (1) determines a probability of interruption of a tracking operation of a subject by the second imaging unit based on at least one of (a) a state of the second imaging unit and (b) information included in an image captured by the second imaging unit, and (2) controls a frequency of acquiring the wide angle image to be higher when the probability of interruption of a tracking operation is greater than or equal to a predetermined threshold than when the probability of interruption of a tracking operation is less than the predetermined threshold.

2. The imaging device according to claim 1, wherein the control unit controls a frequency of acquiring the wide angle image to be higher for a higher probability of interruption of a tracking operation of the subject.

3. The imaging device according to claim 1, wherein the second imaging unit comprises a zoom mechanism capable of changing a capturing view angle, and
wherein the control unit acquires the capturing view angle of the second imaging unit as the state of the second imaging unit and controls the probability of interruption of a tracking operation of the subject to be higher for a narrower capturing view angle.

4. The imaging device according to claim 1, further comprising a detection unit that detects motion of a subject to be a tracking object from an image captured by the second imaging unit,
wherein the control unit acquires motion of the subject as the information included in an image captured by the second imaging unit and controls the probability of interruption of a tracking operation of the subject to be higher for a faster motion of the subject.

5. The imaging device according to claim 1, wherein the control unit calculates a size of the subject to be a tracking object from an image captured by the second imaging unit as the information included in an image captured by the second imaging unit and controls the probability of interruption of a tracking operation of the subject to be higher for a larger size of the subject.

6. The imaging device according to claim 1, wherein each of the plurality of first imaging units comprises an image pickup device, and
wherein the control unit controls the frequency of acquiring the wide angle image by controlling a number of pixel signals to be read out from the image pickup device of the first imaging unit.

7. The imaging device according to claim 6, wherein the control unit controls the frequency of acquiring the wide angle image by reducing pixel signals from the image pickup device of the first imaging unit for readout.

8. The imaging device according to claim 6, wherein the control unit controls the frequency of acquiring the wide angle image by adding and averaging a plurality of pixel signals from the image pickup device of the first imaging unit for readout.

9. The imaging device according to claim 1, wherein a resolution of the wide angle image is higher than a resolution of an image captured by the second imaging unit.

10. The imaging device according to claim 9, wherein the control unit controls the frequency of acquiring the wide angle image by performing a compression process on the wide angle image.

11. The imaging device according to claim 1, wherein the control unit controls the frequency of acquiring the wide angle image by performing down-sampling on images acquired by the plurality of first imaging units before the combining processing unit performs the process of combining.

12. The imaging device according to claim 1, wherein the center of the wide angle image and the rotation center of a drive mechanism are matched to each other within a plane perpendicular to a direction in a narrow capturing view angle of the wide angle image.

13. The imaging device according to claim 1, wherein the control unit reduces a number of pixel signals to be read out for an imaging unit in a capturing direction having a smaller angle relative to a subject of a tracking object out of the plurality of first imaging units.

14. The imaging device according to claim 1, wherein the control unit reduces a number of pixel signals to be read out for an imaging unit in a capturing direction having a larger angle relative to a direction of a subject of a tracking object out of the plurality of first imaging units.

15. The imaging device according to claim 1, further comprising a transfer unit that performs switching between the wide angle image and an image captured by the second imaging unit and sequentially transfers the wide angle image and the image captured by the second imaging unit to a network.

16. A system comprising:
the imaging device according to claim 1; and
a client device connected to the imaging device via a network.

17. A control method of an imaging device, the control method comprising:
- a combining step of combining images acquired by a plurality of first imaging units to generate a wide angle image;
- a capturing step of capturing a part of a region of the wide angle image and acquiring an image by a second imaging unit, wherein a frequency of acquiring an image captured by the second imaging unit is higher than a frequency of acquiring the wide angle image; and
- a control step of (1) determining a probability of interruption of a tracking operation of a subject by the second imaging unit based on at least one of (a) a state of the second imaging unit and $_{(}$b) information included in an image captured by the second imaging unit, and (2) controlling a frequency of acquiring the wide angle image to be higher when the probability of interruption of a tracking operation is greater than or equal to a predetermined threshold than when the probability of interruption of a tracking operation is less than the predetermined threshold.

18. A non-transitory storage medium including a program that causes a computer to function as a control unit, the computer being included in an imaging device that comprises (a) a plurality of first imaging units, (b) a combining processing unit that combines images acquired by the plurality of first imaging units to generate a wide angle image, and (c) a second imaging unit that captures a part of a region of the wide angle image,
- wherein a frequency of acquiring an image captured by the second imaging unit is higher than a frequency of acquiring the wide angle image, and
- wherein the control unit (1) determines a probability of interruption of a tracking operation of a subject by the second imaging unit based on at least one of (a) a state of the second imaging unit and (b) information included in an image captured by the second imaging unit, and (2) controls a frequency of acquiring the wide angle image to be higher when the probability of interruption of a tracking operation is greater than or equal to a predetermined threshold than when the probability of interruption of a tracking operation is less than the predetermined threshold.

* * * * *